US011734680B2

(12) United States Patent
Kumar et al.

(10) Patent No.: US 11,734,680 B2
(45) Date of Patent: Aug. 22, 2023

(54) METHODS AND SYSTEMS FOR DETERMINING AN OPTIMAL INTERBANK NETWORK FOR ROUTING REAL-TIME PAYMENT TRANSACTIONS

(71) Applicant: MASTERCARD INTERNATIONAL INCORPORATED, Purchase, NY (US)

(72) Inventors: Ashish Kumar, Uttar Pradesh (IN); Marilia Isadora Domingues Mendonca, Alpharetta, GA (US); Sangam Verma, Gurugram (IN); Yatin Katyal, Rohtak (IN); Karamjit Singh, Gurugram (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/488,200

(22) Filed: Sep. 28, 2021

(65) Prior Publication Data
US 2022/0101310 A1   Mar. 31, 2022

(30) Foreign Application Priority Data

Sep. 29, 2020   (IN) .............................. 202041042227

(51) Int. Cl.
*G06Q 30/02*   (2023.01)
*G06Q 20/38*   (2012.01)
*G06Q 20/10*   (2012.01)

(52) U.S. Cl.
CPC ......... *G06Q 20/387* (2013.01); *G06Q 20/102* (2013.01); *G06Q 20/108* (2013.01)

(58) Field of Classification Search
CPC .... G06Q 30/02; G06Q 20/387; G06Q 20/102; G06Q 20/108; G06Q 20/401;
(Continued)

(56) References Cited

U.S. PATENT DOCUMENTS 7,624,068 B1   11/2009   Heasley et al.
8,266,057 B2   9/2012   Carroll et al.
(Continued)

FOREIGN PATENT DOCUMENTS

| IN | 128/KOL/2010 A | * | 5/2012 | ............. G06Q 20/00 |
| JP | 3700983 | | 9/2005 | |
| WO | WO 2017/059203 A1 | * | 4/2017 | ............. G06Q 20/08 |

OTHER PUBLICATIONS

Engelmann, Felix; Glaser, Florian; Kopp, Henning; Kargl, Frank, Towards an Economic Analysis of Routing in Payment Channel Networks (English), Nov. 7, 2017 (Year: 2017).*
(Continued)

*Primary Examiner* — Marilyn G Macasiano
(74) *Attorney, Agent, or Firm* — Harness, Dickey & Pierce, P.L.C.

(57) ABSTRACT

Embodiments provide methods and systems for determining optimal interbank network for routing payment transactions. Method performed by server system includes accessing historical transaction data of acquirer from acquirer database, determining payment transaction types corresponding to future payment transactions processing via acquirer for particular period of time based on historical transaction data, predicting fixed interchange cost for each payment transaction type incurring to acquirer for routing future payment transactions through interbank network of interbank networks based on interchange prediction model, performing linear optimization utilizing set of metrics, to make decision whether to apply merchant-specific discount to particular payment transaction type, or not, and routing real-time payment transactions through optimal interbank networks with lowest total transaction cost. Set of metrics includes total transaction cost for each payment transaction type, discount factor of interbank network, and number of future (Continued)

payment transactions routing through interbank network. Optimal interbank network is determined using linear optimization.

14 Claims, 11 Drawing Sheets

(58) Field of Classification Search
CPC ............ G06Q 20/4016; G06Q 20/405; G06Q 20/027; G06Q 30/0254; G06Q 10/067; G06Q 30/0246; G06Q 30/0207
See application file for complete search history.

(56) References Cited

U.S. PATENT DOCUMENTS

| | | | |
|---|---|---|---|
| 8,886,563 B2 | 11/2014 | Sakata et al. | |
| 10,402,807 B1 | 9/2019 | Iyer et al. | |
| 10,498,651 B1* | 12/2019 | Cothran | ............ H04L 45/22 |
| 10,540,643 B2 | 1/2020 | Subramanian et al. | |
| 10,956,877 B2* | 3/2021 | Srinivasan | ............ G06Q 20/08 |
| 11,321,717 B2* | 5/2022 | Kandasamy | ....... G06Q 20/4093 |
| 2010/0030634 A1 | 2/2010 | McElroy et al. | |
| 2012/0158566 A1 | 6/2012 | Fok et al. | |
| 2012/0271765 A1 | 10/2012 | Cervenka et al. | |
| 2013/0159151 A1 | 6/2013 | McElroy et al. | |
| 2013/0282563 A1* | 10/2013 | Masterson | ............ G06Q 20/08 |
| | | | 705/39 |
| 2014/0040114 A1* | 2/2014 | Baumgart | ............ G06Q 20/102 |
| | | | 705/39 |
| 2015/0221028 A1 | 8/2015 | White et al. | |
| 2017/0243207 A1 | 8/2017 | Lorberg et al. | |
| 2019/0379595 A1 | 12/2019 | Ur et al. | |

OTHER PUBLICATIONS

J.C. Paradi; C. Marr;M. Wong; G, Yan, Simulation based alternative strategies in risk and service guarantee tradeoffs in the international funds transfer system at a large Canadian Bank (English), IEEE Transactions on Engineering Management (vol. 42, Issue: 4, pp. 387-396) (Year: 1995).*

* cited by examiner

US 11,734,680 B2

METHODS AND SYSTEMS FOR DETERMINING AN OPTIMAL INTERBANK NETWORK FOR ROUTING REAL-TIME PAYMENT TRANSACTIONS

CROSS-REFERENCE TO RELATED APPLICATION

This application claims the benefit of, and priority to, Indian Patent Application No. 202041042227 filed on Sep. 29, 2020. The entire disclosure of the above application is incorporated herein by reference.

FIELD

The present disclosure generally relates to electronic methods and systems for determining an optimal interbank network for routing payment transactions and, more particularly relates to, determining the optimal interbank network with the lowest transaction cost for routing future payment transactions between acquirers and issuers.

BACKGROUND

This section provides background information related to the present disclosure which is not necessarily prior art.

Merchants are associated with point-of-sale (POS) devices for performing payment transactions using customer's payment cards (e.g., debit cards, credit cards) and other payment instruments in exchange of goods or services from the merchants. The payment transaction between the merchant and the customer involves at least an issuing bank associated with a bank account of the customer, an acquiring bank associated with the merchant, and an interchange payment network (e.g., Maestro®, Star®, Interlink®, Pulse®, etc.). In general, the issuing bank charges a static interchange fee for each transaction. The interchange fee, however, may vary from transaction to transaction, and may depend on numerous factors other than the transaction amount. Similarly, the interchange payment network also takes a fixed switching cost for each transaction.

In existing systems, payment transactions between the issuing bank and the acquiring bank route through a preferred interchange payment network as defined by the acquiring bank and the issuing bank. Fixed lists of interchange payment networks may be predefined by the issuing bank and the acquiring bank for a particular type of payment transaction. In some cases, during the payment transaction, the list of interchange payment networks of the issuing bank and the acquiring bank may be compared for identifying the first match from the fixed list associated with both the banks. Thus, the first match is selected to be an interbank network for routing the payment transaction.

However, existing systems do not consider various dynamic features effecting interchange rates for the payment transaction. As a result, the payment transaction routing in the static system does not provide a cost-effective process in routing the payment transactions. Further, transaction routing may not take advantage of merchant-specific discount services provided by various interchange payment networks.

Thus, there exists a need for a technological solution for routing payment transactions through an interchange payment network in a cost-effective manner that can minimize total transaction costs for the acquiring bank, through the use of various optimization techniques.

SUMMARY

This section provides a general summary of the disclosure, and is not a comprehensive disclosure of its full scope or all of its features. Aspects and embodiments of the disclosure are set out in the accompanying claims.

Various embodiments of the present disclosure provide systems and methods for determining an optimal interbank network for routing payment transactions is disclosed.

In an embodiment, a computer-implemented method is disclosed. The computer-implemented method performed by a server system includes accessing historical transaction data associated with an acquirer from an acquirer database and determining a plurality of payment transaction types corresponding to future payment transactions processing via the acquirer for a particular period of time based, at least in part, on the historical transaction data. The computer-implemented method includes predicting a fixed interchange cost for each payment transaction type incurring to the acquirer for routing the future payment transactions through an interbank network of a plurality of interbank networks based, at least in part, on an interchange prediction model. The computer-implemented method includes performing a linear optimization utilizing a set of metrics, to make a decision whether to apply a merchant-specific discount to a particular payment transaction type, or not. The set of metrics includes comprising a total transaction cost for each payment transaction type, a discount factor associated with the interbank network, and a number of future payment transactions routing through the interbank network. Further, the computer-implemented method includes routing real-time payment transactions through an optimal interbank network with a lowest total transaction cost, wherein the optimal interbank network is determined using the linear optimization.

In another embodiment, a server system is disclosed. The server system includes a communication interface, a memory including executable instructions, and a processor communicably coupled to the communication interface. The processor is configured to execute the executable instructions to cause the server system to at least access a historical transaction data associated with an acquirer from an acquirer database, and determine a plurality of payment transaction types corresponding to future payment transactions processing via the acquirer for a particular period of time based, at least in part, on the historical transaction data. The server system is further caused to predict a fixed interchange cost for each payment transaction type incurring to the acquirer for routing the future payment transactions through an interbank network of a plurality of interbank networks based, at least in part, on an interchange prediction model. The server system is further caused to perform a linear optimization utilizing a set of metrics, to make a decision whether to apply a merchant-specific discount to a particular payment transaction type, or not. The set of metrics includes a total transaction cost for each payment transaction type, a discount factor associated with the interbank network, and a number of payment transactions routing through the interbank network. The server system is further caused to route real-time payment transactions through an optimal interbank network with a lowest total transaction cost, wherein the optimal interbank network is determined using the linear optimization.

In yet another embodiment, another computer-implemented method is disclosed. The computer-implemented method performed by a server system includes accessing historical transaction data associated with an acquirer from an acquirer database and determining a plurality of payment transaction types corresponding to future payment transactions processing via the acquirer for a particular period of time based, at least in part, on the historical transaction data.

The computer-implemented method includes predicting a fixed interchange cost for each payment transaction type incurring to the acquirer for routing the future payment transactions through an interbank network of a plurality of interbank networks based, at least in part, on an interchange prediction model. The computer-implemented method includes performing a linear optimization utilizing a set of metrics, to make a decision whether to apply a merchant-specific discount to a particular payment transaction type, or not. The set of metrics includes comprising a total transaction cost for each payment transaction type, a discount factor associated with the interbank network, and a number of future payment transactions routing through the interbank network. Further, the computer-implemented method includes determining whether the number of future payment transactions routing through the interbank network exceeds a threshold value, or not, and routing real-time payment transactions through an optimal interbank network with a lowest total transaction cost, wherein the optimal interbank network is determined using the linear optimization.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. For a more complete understanding of example embodiments of the present technology, reference is now made to the following descriptions taken in connection with the accompanying drawings in which.

Figure 5A:
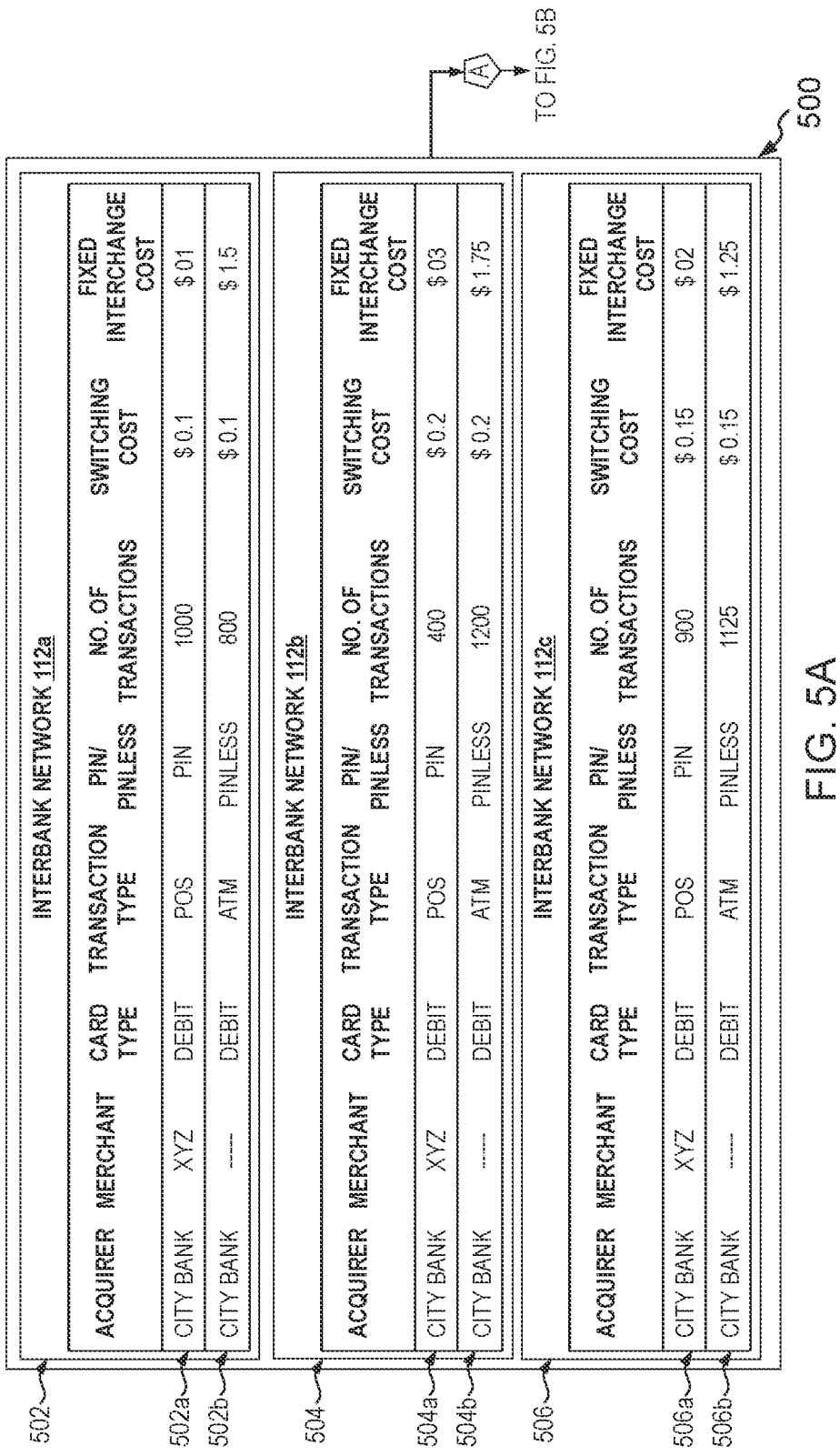
Figure 5B:
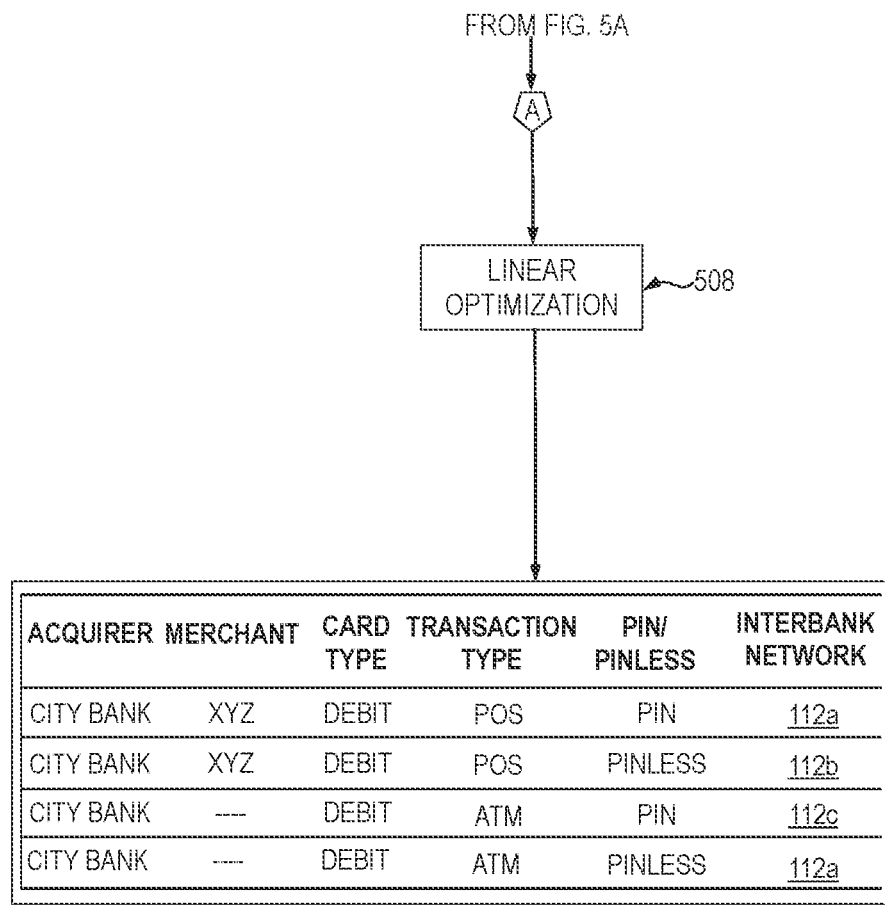
Figure 6:
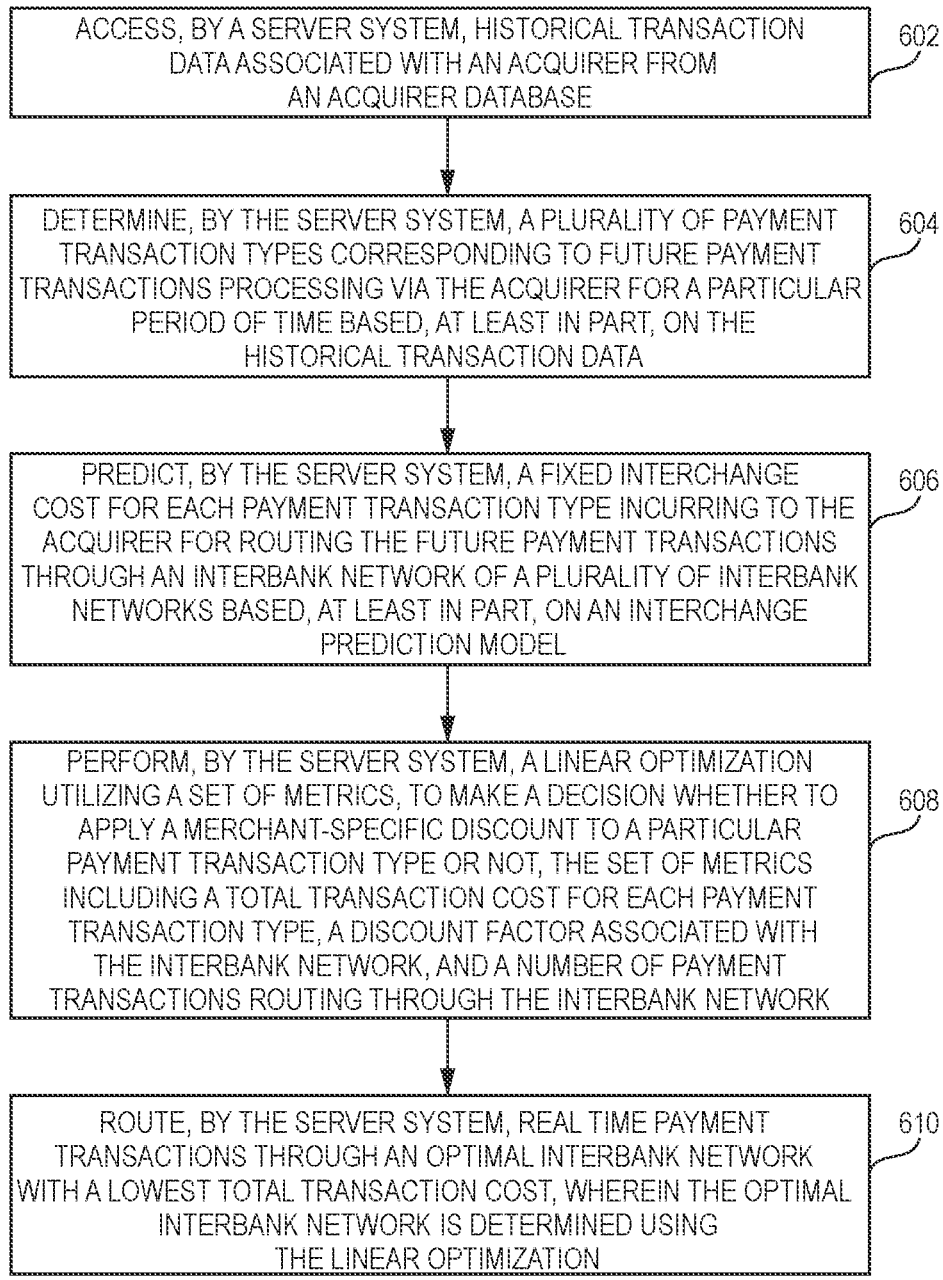
Figure 7:
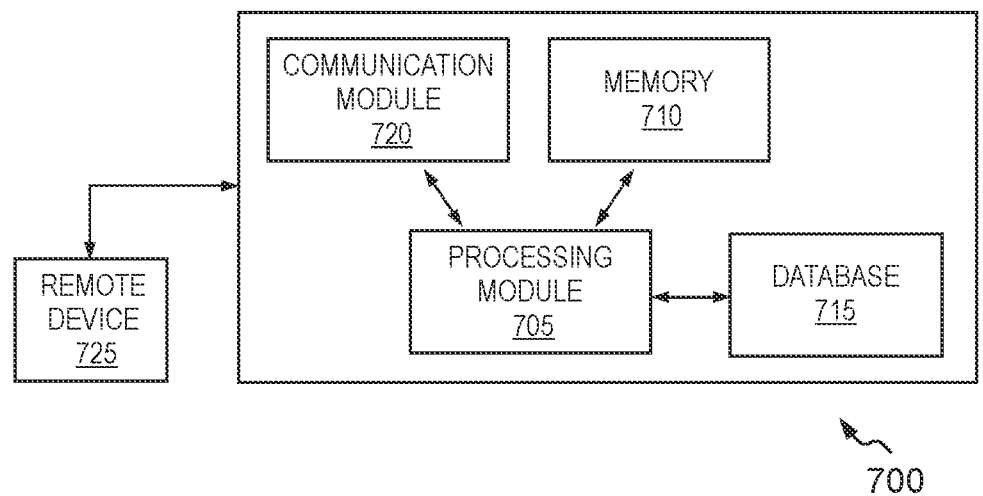
Figure 8:
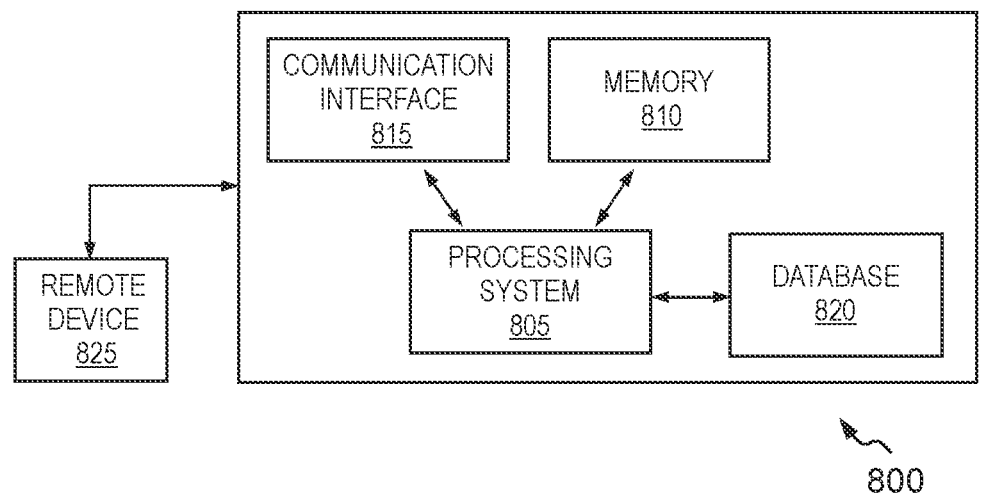
Figure 9:
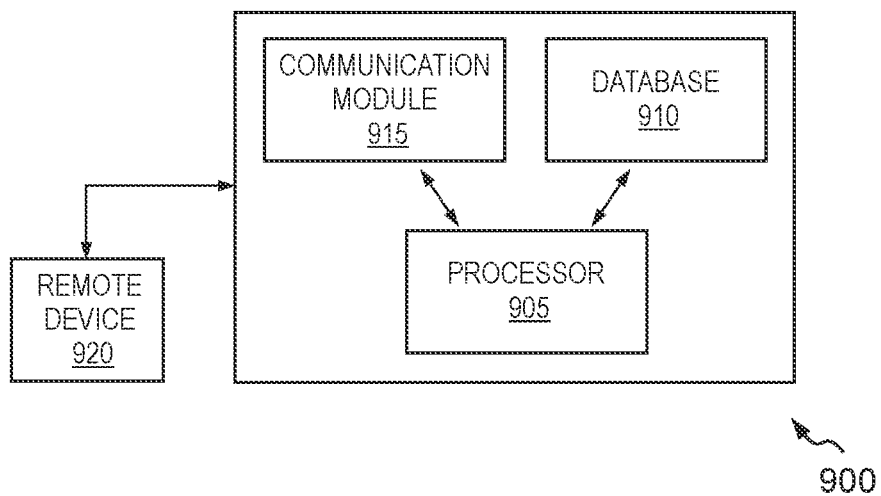
Figure 10:
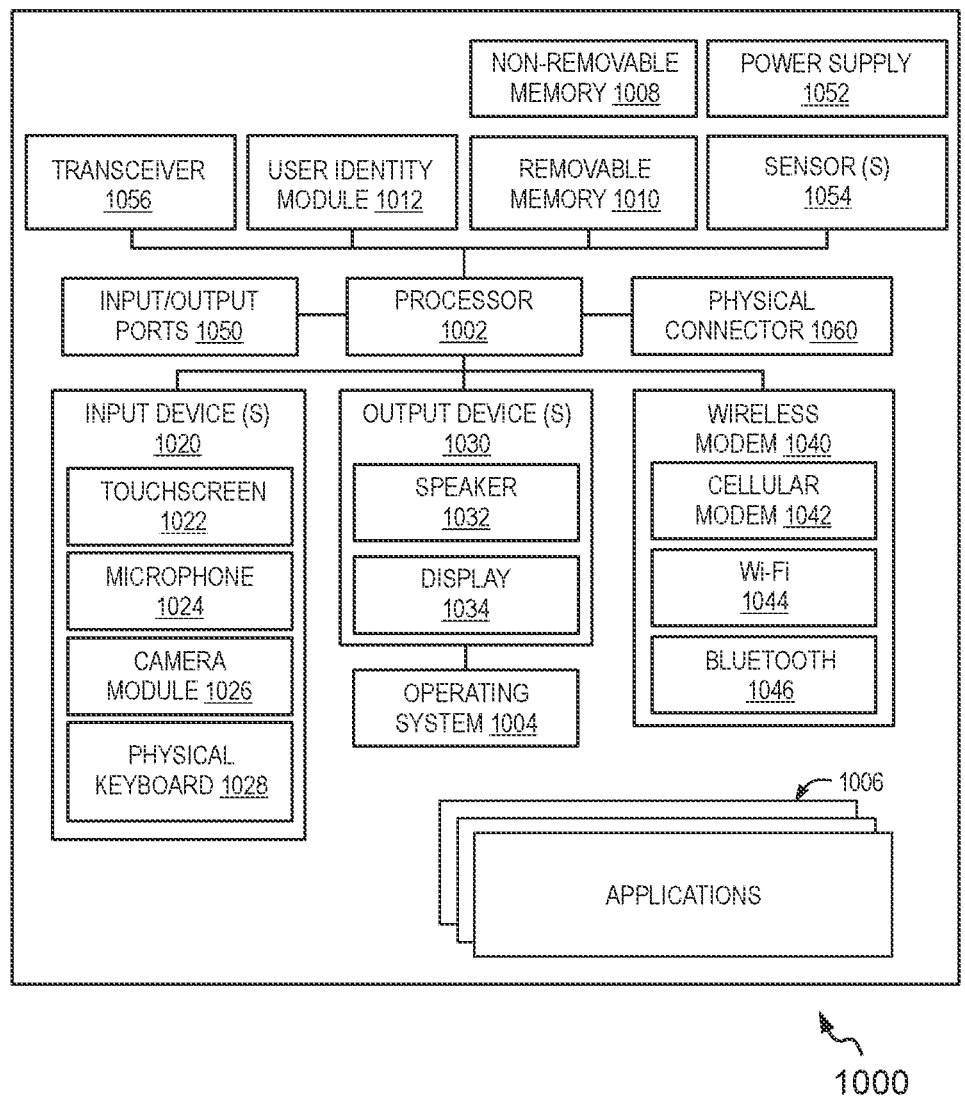

FIGS. 5A and 5B, collectively, represent example representations depicting determination of the best interbank network for each payment transaction type in tabular form, in accordance with an example embodiment of the present disclosure;

FIG. 6 represents a flow diagram of a computer-implemented method for determining an optimal interbank network for future payment transactions between an acquirer and an issuer, in accordance with an example embodiment of the present disclosure;

FIG. 7 is a simplified block diagram of an acquirer server, in accordance with an embodiment of the present disclosure;

FIG. 8 is a simplified block diagram of a payment gateway server, in accordance with an embodiment of the present disclosure;

FIG. 9 is a simplified block diagram of an issuer server, in accordance with one embodiment of the present disclosure; and FIG. 10 is a simplified block diagram of a user device capable of implementing at least some embodiments of the present disclosure.

The drawings referred to in this description are not to be understood as being drawn to scale except if specifically noted, and such drawings are only exemplary in nature. Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure. In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "issuer", used throughout the description, refers to a financial institution normally called an "issuer bank" or "issuing bank" in which an individual or an institution may have an account. The issuer also issues a payment card, such as a credit card or a debit card, etc. Further, the issuer may also facilitate online banking services, such as electronic money transfer, bill payment, etc., to the account holders through a server system called an "issuer server" throughout the description. Further, the term "acquirer" is an organization that transmits a purchase transaction to a payment card system for routing to the issuer of the payment card account in question. Typically, the acquirer has an agreement with merchants, wherein the acquirer receives authorization requests for purchase transactions from the merchants, and routes the authorization requests to the issuers of the payment cards being used for the purchase transactions. The terms "acquirer", "acquiring bank", "acquiring bank" or "acquirer bank" will be used interchangeably herein. Further, one or more server systems associated with the acquirer are referred to as "acquirer server" to carry out its functions.

The term "payment account" used throughout the description refers to a financial account that is used to fund the financial transaction (interchangeably referred to as "payment transaction"). Examples of the payment account include, but are not limited to, a savings account, a credit account, an e-wallet account, a checking account and a virtual payment account. The payment account may be associated with an entity, such as an individual person, a family, a commercial entity, a company, a corporation, a governmental entity, a non-profit organization, and the like. In some scenarios, a payment account may be a virtual or temporary payment account that can be mapped or linked to a primary payment account, such as those accounts managed by payment wallet service providers.

The term "interbank network", used throughout the description, refers to a network or collection of systems used for transfer of funds through use of cash-substitutes from one financial institution to another financial institution. The terms "interbank network" or "interchange payment network" will be used interchangeably herein. Interbank networks may use a variety of different protocols and procedures in order to process the transfer of money for various types of transactions. Transactions that may be performed via an interbank network may include product or service purchases, credit purchases, debit transactions, fund transfers, account withdrawals, etc. Interbank networks may be configured to perform transactions via cash-substitutes, which may include payment cards, letters of credit, checks, financial accounts, etc. Examples of networks or systems configured to perform as interbank networks include those operated by various payment interchange networks, such as Mastercard®.

The term "payment gateway server", used throughout the description, may refer to a server that enables transaction processing via multiple payment interchange networks through a single connection to the payment gateway server. The payment gateway server delivers authorization services, exception file services, and clearing and settlement services. In one example, an authorization request message received by the payment gateway server may be routed to one of a plurality of interchange payment networks according to a routing priority list.

Overview

Various example embodiments of the present disclosure provide methods, systems, user devices, and computer program products for determining an optimal interbank network for routing payment transactions between an acquirer and an issuer and optimizing a total transaction cost for each payment transaction type.

In various example embodiments, the present disclosure describes a server system that determines an optimal interbank network with a lowest transaction cost. The server system includes at least a processor and a memory. In one example, the server system is a payment gateway server. The server system is configured to access historical transaction data associated with the acquirer from an acquirer database. The historical transaction data includes, but is not limited to, transaction history between the acquirer and an issuer. The server system is configured to train a machine-learning model based at least on the historical transaction data. In one embodiment, the machine-learning model is also re-trained based on real time transactions between the acquirer and the issuer. The machine-learning model is utilized for determining or predicting the plurality of payment transaction types (e.g., Point-of-Sale (POS), Automatic Teller Machine (ATM), e-commerce based payment transactions, etc.), corresponding to the future payment transactions processing via the acquirer for a particular period of time (e.g., next one year).

Thereafter, the server system is configured to identify a plurality of interbank networks which are eligible for routing the future payment transactions between the acquirer and the issuer based, at least in part, on interbank network routing tables and predefined constraints associated with the acquirer and the issuer. The interbank routing tables include lists of compatible interbank networks associated with the acquirer and the issuer.

The server system is configured to train an interchange prediction model based at least on interchange rate rules of the plurality of interbank networks. The interchange rate rules define what interchange cost would be charged by the plurality of interbank networks for the payment transactions. The server system is configured to predict a fixed interchange cost for each payment transaction type incurring to the acquirer for routing the future payment transactions through an interbank network of the plurality of interbank networks based, at least in part, on the interchange prediction model.

Then, the server system is configured to calculate a total transaction cost incurring to the acquirer for routing a payment transaction through an interbank network which is a sum of predicted fixed interchange cost and a switching cost associated with the interbank network.

The server system is configured to perform a linear optimization utilizing a set of metrics, to make a decision whether to apply a merchant-specific discount to a particular payment transaction type, or not. The set of metrics includes the total transaction cost for each payment transaction type, a discount factor associated with the interbank network, and a number of future payment transactions routing through the interbank network.

When the number of future payment transactions routing through the interbank network exceeds a threshold value, the server system is configured to apply a merchant-specific discount to the fixed interchange cost for determining a reduced total transaction cost for the particular payment transaction type.

The server system is configured to determine whether the interbank network is an optimal interbank network, or not, based on the linear optimization. In other words, the server system determines total transaction cost for each interbank network and identifies the interbank network which has the lowest transaction cost, thereby reducing transaction costs for the acquirer. The server system is configured to select that interbank network for transaction routing for the acquirer for the particular payment transaction type. Further, upon determining the optimal interbank network, the server system may route the future payment transaction of the particular transaction type to the acquirer in real-time through the predicted optimal interbank network.

Various embodiments of the present disclosure offer multiple advantages and technical effects. For instance, the present disclosure provides a dynamic transaction routing process, improving acquirer side experience by providing the best cost-effective interchange rates across multiple interbank networks. Further, the present disclosure provides information of optimal interbank networks, proactively, to the server system (e.g., "payment gateway server"), for different types of future payment transactions, allowing the server system to make a decision whether to apply merchant-specific discount to a particular transaction, or not. Further, the present disclosure provides a profit optimal routing solution taking care into account the variable interchange pricing in payment transactions, reducing losses of acquirers due to high interchange rates. Additionally, utilizing the linear optimization algorithm for a dynamic transaction routing decision provides more optimized transactions costs incurring to the acquirer by routing the payment transactions to the best optimal interbank network.

Various example embodiments of the present disclosure are described hereinafter with reference to FIGS. 1 to 10.

Figure 1:
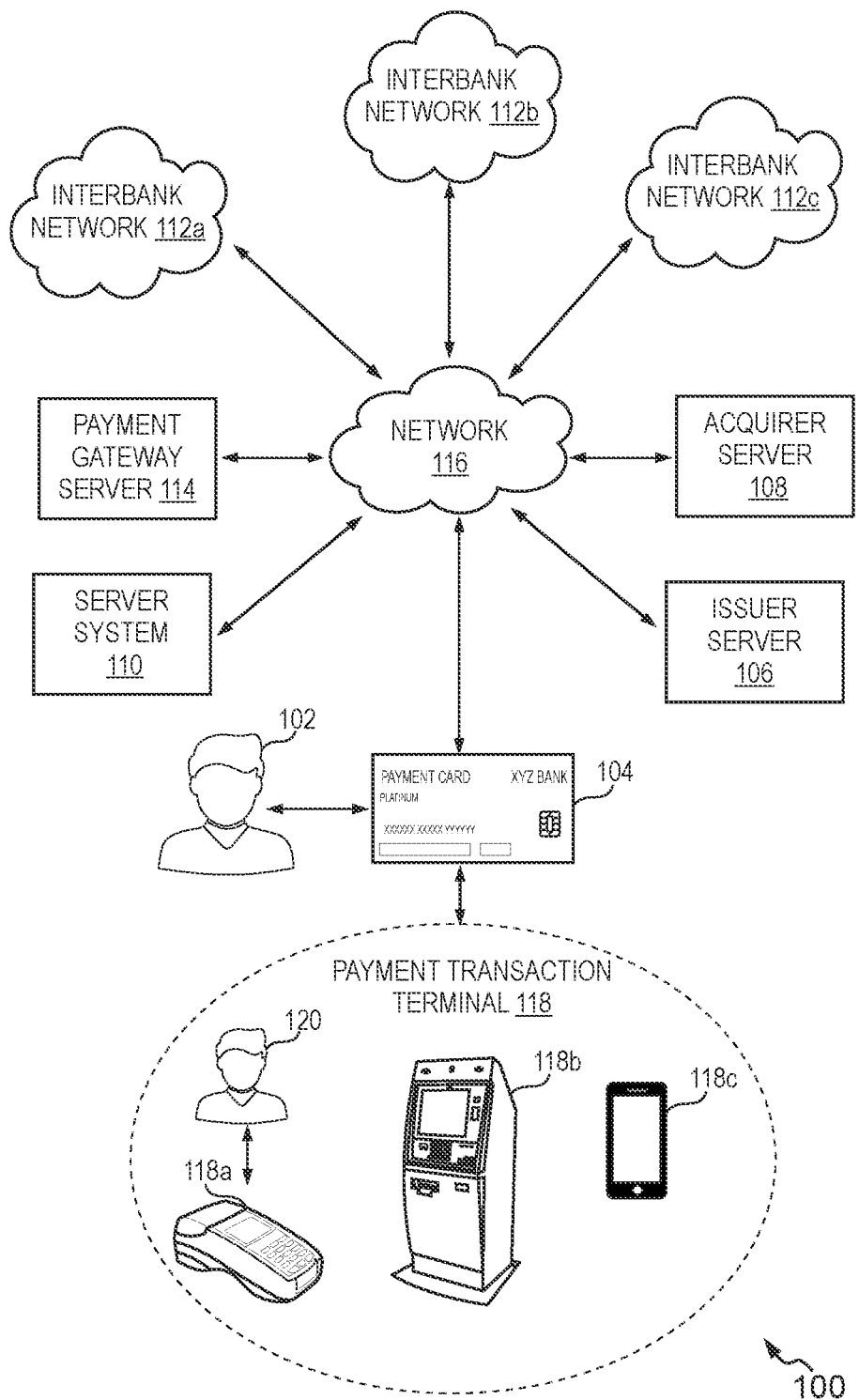
FIG. 1 is an example representation of an environment, related to at least some example embodiments of the present disclosure.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, real-time routing of financial transactions between an issuer and an acquirer in a cost-effective manner. The environment 100 generally includes an issuer server 106, an acquirer server 108, a plurality of interbank networks 112a, 112b and 112c, and a payment gateway server 114, each coupled to, and in communication with a network 116. For illustrative purpose, only three interbank networks, such as the interbank networks 112a-112c are herein depicted in the environment 100. In one embodiment, the interbank networks 112a-112c (interchangeably referred to as "interchange payment network" throughout the description) which are interchange payment networks for routing payment transactions are explained in further sections in the present disclosure.

Various entities in the environment 100 may connect to the network 116 in accordance with various wired and wireless communication protocols, such as, Transmission Control Protocol and Internet Protocol (TCP/IP), User Datagram Protocol (UDP), $2^{nd}$ Generation (2G), $3^{rd}$ Generation (3G), $4^{th}$ Generation (4G), $5^{th}$ Generation (5G) communication protocols, Long Term Evolution (LTE) communication protocols, or any combination thereof. The network 116 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof. For example, the network 116 may include multiple different networks, such as a private network, made accessible by the interbank networks 112a-112c to the issuer server 106 and the acquirer server 108 and separately, a public network (e.g., the Internet) through which the acquirer server 108, the issuer server 106, and the payment gateway server 114 may communicate.

The environment 100 also includes a server system 110 configured to perform one or more of the operations described herein. In one example, the server system 110 is a payment gateway server. In general, the server system 110 is configured to perform routing of payment transactions through the plurality of payment interchange networks 112a, 112b and 112c. The server system 110 is a separate part of the environment 100, and may operate apart from (but still in communication with, for example, via the network 116) the acquirer server 108, the payment gateway server 114, and any third party external servers (to access data to perform the various operations described herein). However, in other embodiments, the server system 110 may actually be incorporated, in whole or in part, into one or more parts of the environment 100, for example, the payment gateway server 114. In addition, the server system 110 should be understood to be embodied in at least one computing device in communication with the network 116, which may be specifically configured, via executable instructions, to perform as described herein, and/or embodied in at least one non-transitory computer readable media.

In one embodiment, the acquirer server 108 is associated with a financial institution (e.g., a bank) that processes financial transactions. This can be an institution that facilitates the processing of payment transactions for physical stores, merchants, or an institution that owns platforms that make online purchases or purchases made via software applications possible (e.g., shopping cart platform providers and in-app payment processing providers).

The environment 100 also includes a payment transaction terminal 118 that communicates directly, or indirectly, with the acquirer server 108. Examples of the payment transaction terminal 118 include, but are not limited to a Point-of-Sale (POS) terminal 118a, an Automatic Teller Machine (ATM) terminal 118b, and a user device 118c with a payment gateway application. The POS terminal 118a is usually located at stores or facilities of a merchant 120. The merchant can have more than one payment transaction terminal. In one embodiment, a user 102 may perform a payment transaction using the user device 118c (i.e., the mobile phone) which conforms to an e-commerce payment transaction. In one embodiment, the payment transaction may be associated with card present or card-not-present transaction types.

In one embodiment, the payment transaction terminal 118 may also include, but not limited to, a payment card reader, such as a magnetic card reader or smart card reader (e.g., an EMV card reader or a contactless card reader), or a virtual wallet reader. Thus, transaction types of the payment transactions may be, but not limited to, POS transactions (PIN or PIN less), ATM transactions, ecommerce transactions (i.e., card-not present transaction), or wallet based transactions, etc.

In the illustrative embodiment, the user 102 may be a cardholder 102 (e.g., as shown in FIG. 1). More specifically, the user 102 may be any individual buyer, representative of a corporate entity, or any other person that is presenting a credit or debit card during a payment transaction with a merchant representative or other seller. The cardholder 102 may have a payment account issued by an issuing bank (associated with the issuer server 106) and may be provided a payment card 104 with financial or other account information encoded onto the payment card 104 such that the cardholder 102 may use the payment card 104 to initiate and complete a payment transaction using a bank account at the issuing bank. Non-financial transactions may also be completed using the payment card 104 provided by an issuer but in the interest of brevity, the system of FIG. 1 focuses on a payment transaction.

In one embodiment, the issuer server 106 is associated with a financial institution normally called an "issuer bank" or "issuing bank" or simply "issuer", in which the cardholder or the user 102 may have a payment account, (which also issues a payment card, such as a credit card, a pre-paid card, or a debit card), and provides microfinance banking services (e.g., payment transaction using credit/debit cards) for processing electronic payment transactions, to the cardholder 102.

In one example, the cardholder 102 purchases a good or service from a merchant using the payment card 104. The cardholder 102 may utilize the payment card 104 to effectuate payment by presenting/swiping the payment card 104 to the POS terminal 118a. Upon presentation of the physical or virtual payment card, account details (i.e., account number) are accessed by the POS terminal 118a. The POS terminal 118a sends payment transaction details to the acquirer server 108. The acquirer server 108 sends a payment transaction request to the server system 110 for routing the payment transaction. In one embodiment, the payment transaction request can be implemented as a single or dual message transaction. In a single message transaction, authorization and settlement are performed together. In a dual message transaction, authorization is performed as a first step and settlement is performed as a second step.

The server system 110 accesses lists of preferred interbank networks of the issuer server 106 and the acquirer server 108 for the POS transaction. Based on a first match of an interbank network in both lists, the server system 110 routes the payment transaction through the interbank network. However, in this scenario, the server system 110 does not consider dynamic effects of interchange rates for the payment transactions while routing the payment transaction, which may end up in high interchange fees to the acquirer server 108.

In one embodiment, the server system 110 is configured to perform one or more of the operations described herein. The server system 110 is configured to perform dynamic routing of payment transactions initiated from the acquirer server 108 through an interbank network with the lowest interchange rate. In one embodiment, the server system 110 performs a dynamic optimization utilizing a set of relevant features that can effect transaction interchange rates and then determines which interbank network should be selected for the payment transaction based on the set of relevant features. More particularly, the server system 110 is configured to determine payment transaction types of future payment transactions originated from the acquirer server 108 and identify an interbank network with the lowest interchange rate for a certain type of transaction for the acquirer server 108 based on static and dynamic interchange rate rules.

In one embodiment, the interbank networks 112a-112c (i.e., "interchange payment networks") may be used by the payment cards issuing authorities as an interchange payment network. Examples of interchange payment networks include, but are not limited to, Mastercard® payment system interchange network. The Mastercard® payment system interchange network is a proprietary communications standard promulgated by Mastercard International Incorporated® for the exchange of financial transaction data between two entities that are members of Mastercard International Incorporated®. (Mastercard is a registered trademark of Mastercard International Incorporated located in Purchase, N.Y.).

The number and arrangement of systems, devices, and/or networks shown in FIG. 1 are provided as an example. There may be additional systems, devices, and/or networks, fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
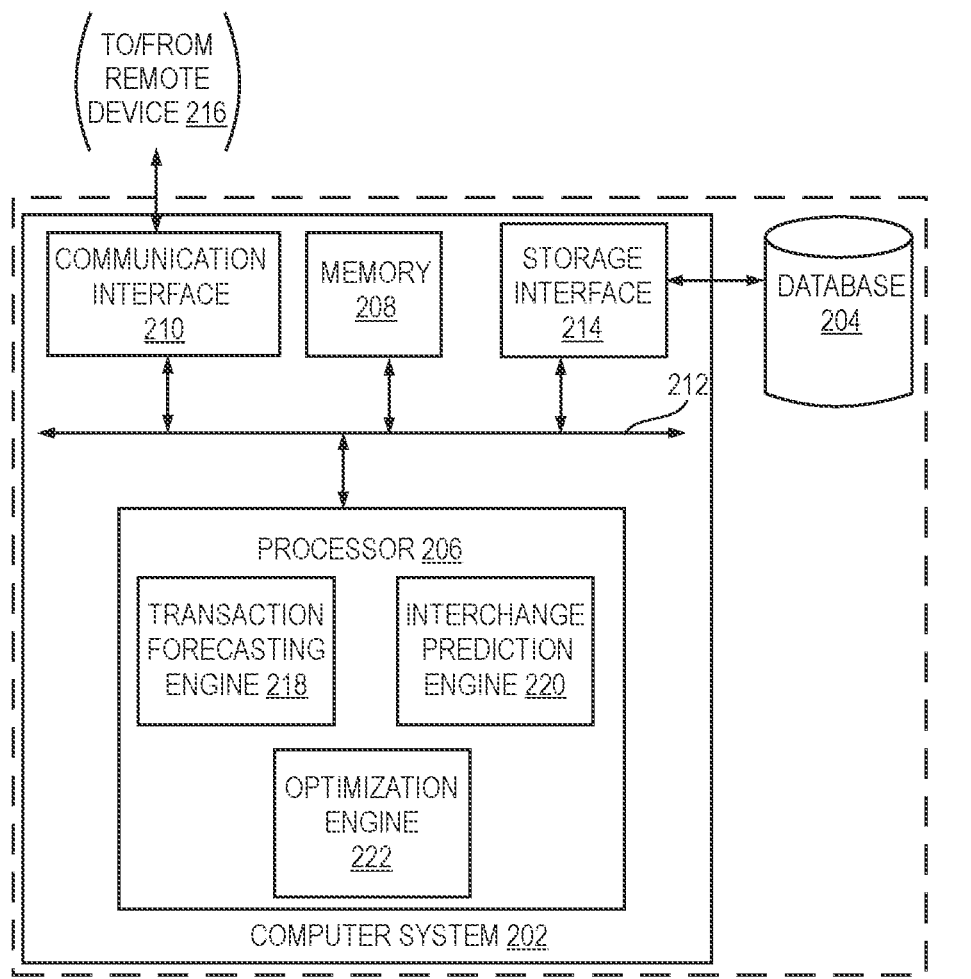
FIG. 2 is a simplified block diagram of a server system, in accordance with one embodiment of the present disclosure.

Referring now to FIG. 2, a simplified block diagram of a server system 200, is shown, in accordance with an embodiment of the present disclosure. For example, the server system 200 is similar to the server system 110 as described in FIG. 1. In some embodiments, the server system 200 is embodied as a cloud-based and/or SaaS-based (software as a service) architecture. The server system 200 is configured to determine an interbank network with the lowest interchange rate incurring to the acquirer server 108 for future payment transactions. In one embodiment, the server system 200 includes a computer system 202 and a database 204. The computer system 202 includes at least one processor 206 for executing instructions, a memory 208, and a communication interface 210. The one or more components of the computer system 202 communicate with each other via a bus 212.

In one embodiment, the database 204 is integrated within computer system 202. For example, the computer system 202 may include one or more hard disk drives as the database 204. A storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

In one embodiment, the database 204 is configured to store machine-learning models, interchange rate rules of a plurality of interbank networks, and interbank routing tables of the acquirer 108 and the issuer 106.

The processor 206 includes suitable logic, circuitry, and/or interfaces to execute computer readable instructions for provisioning payment transaction routing and/or optimization services. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In some embodiments, the memory 208 may be realized in the form of a database server or a cloud storage working in conjunction with the server system 200, without deviating from the scope of the present disclosure.

The processor 206 is operatively coupled to the communication interface 210 such that the processor 206 is capable of communicating with a remote device 216 such as, the issuer server 106, the acquirer server 108, or with any entity connected to the network 116 (e.g., as shown in FIG. 1). In one embodiment, the processor 206 is configured to access historical transaction data associated with the acquirer server 108 from an acquirer database. The historical transaction data may be related to a number of payment transactions processed by the acquirer server 108 in past time. The number of payment transactions may be associated with one or more different payment transaction types. In one embodiment, the processor 206 is configured to receive interbank network routing tables including all eligible interbank network lists and static priority routing lists from the acquirer server 108 and the issuer server 106.

It is noted that the server system 200, as illustrated and hereinafter described, is merely illustrative of an apparatus that could benefit from embodiments of the present disclosure and, therefore, should not be taken to limit the scope of the present disclosure. It is noted that the server system 200 may include fewer or more components than those depicted in FIG. 2.

In one embodiment, the processor 206 includes a transaction forecasting engine 218, an interchange prediction engine 220, and an optimization engine 222.

The transaction forecasting engine 218 includes a suitable logic and/or interfaces for determining a plurality of payment transaction types of future or upcoming payment transactions from the acquirer server 108 within a particular period of time (i.e., "6 months), based at least on the historical transaction data. In one example, the future payment transactions will be routed to an issuer (e.g., "Bank A") from the acquirer (e.g., "Bank B"). In another example, the future payment transactions will be routed to one or more issuers from the acquirer 108 (e.g., "Bank B").

In one embodiment, the historical transaction data may be payment transactions between the issuer server 106 and the acquirer server 108. In one embodiment, the historical transaction data is mined to determine the plurality of payment transaction types for the future payment transactions based at least on particular payment card types, particular data elements representing transaction types (e.g., POS, ATM, e-commerce, etc.), and so forth.

In one example embodiment, the server system 200 may access web servers, merchant database associated with the acquirer server 108, or one or more data sources for receiving the historical transaction data. In an alternate embodiment, historical transaction data may be communicated to the server system 200 in response to one or more requests for the information.

More particularly, the transaction forecasting engine 218 implements a machine-learning model (e.g., time-series forecasting model) over the historical transaction data for predicting the future payment transactions from the acquirer server 108 for the particular period of time. The machine-learning model is trained based at least on the historical transaction data.

In one embodiment, the machine-learning model may employ time series analysis techniques, such as, for example, Exponential Smoothing Models (ESM), Auto-Regressive Integrated Moving Average Models either with or without exogenous variables (ARIMA[X]), Unobserved Component Models (UCM), Intermittent Demand Models (IDM), and the like. In one embodiment, the machine-learning model may also be re-trained with real-time payment transaction data at different time intervals (e.g., daily, weekly, monthly). In one non-limiting example, the machine-learning model may be, but not limited to, reinforcement machine-learning model, which is utilized for algorithms to reduce transit time, and for optimizing space utilization and warehouse operations.

In one embodiment, the historical transaction data is submitted by a merchant (e.g., the merchant 120) to the server system 200.

The interchange prediction engine 220 includes a suitable logic and/or interfaces for determining a fixed or static interchange cost incurring to the acquirer server 108 for different types of upcoming or future payment transactions from each interbank network (e.g., "the interbank network 112*a*"). The fixed interchange cost includes an interchange fee assessed based on an interchange rate defined by the issuer server 106 that may be a percentage of a payment transaction. The interchange rate for a particular payment transaction may vary significantly based on characteristics of the payment transaction. Transaction characteristics that may influence the interchange rate include, but are not limited to, whether the payment transaction was made with a debit or credit card, the amount of the transaction, the nature of the goods and services purchased, whether the transaction was conducted online or at a brick and mortar location such that the payment card was physically presented, the payment program or service enrolled in by a merchant, whether the transaction was processed entirely electronically, and the location of the payment transaction (e.g., domestic or international).

The interchange prediction engine 220 implements an interchange prediction model which is trained based at least on interchange rate rules for a plurality of interbank networks and the historical transaction data associated with the acquirer server 108. The plurality of interbank networks is the interbank networks which are associated with both the acquirer 108 and the issuer 106. The interchange rate rules define what interchange cost is applied for a particular payment transaction. The interchange rate rules include a plurality of parameters such as, but not limited to, payment transaction type, payment transaction amount, merchant category code (MCC), and payment card type (e.g., debit card, credit card), mode of payment transaction (e.g., personal identification number (PIN) transactions, PINless transactions), for determining the fixed interchange cost. In other words, the interchange cost may be calculated based on information such as the merchant's type of business, whether the transaction is a "card-present" transaction, card brand, region, card type, type of transaction, card entry method, etc.

The interchange prediction model involves finding and quantifying a relationship between feature values and a dependent variable, such that the relationship can be used to predict the value of the dependent variable given a set of feature values. In this case, the dependent variable is the interchange cost and the interchange prediction model is generated so as to estimate or predict the interchange cost that will be charged for future payment transactions based on the transaction information and/or transaction feature values associated with the future payment transaction.

In one embodiment, the interchange prediction engine 220 determines a fixed interchange fee incurred to the acquirer 108 for routing a payment transaction of a transaction type from each interbank network.

In one non-limiting example, the interbank networks may be interbank network "A", interbank network "B", and/or any other interbank networks. For instance, the interbank network "A" may charge an amount of $0.25 for a debit card payment transaction, and an amount of $0.30 for a credit card payment transaction. In another instance, the interbank network "B" may charge an amount of $0.35 for the debit card payment transaction and an amount of $0.32 for the credit card payment transactions. The interchange cost rules pertaining to each interbank networks may vary based on predefined constraints associated with the issuing bank 106 and the acquiring bank 108.

The processor 206 is configured to calculate total transaction costs for the plurality of payment transaction types routing through the plurality of interbank networks, respectively. Total transaction cost includes, but is not limited to, a sum of the predicted fixed interchange cost and a static switching cost (or card network fee) charged by the interbank network.

The optimization engine 222 is configured to perform a linear optimization utilizing a set of metrics to determine an interbank network with the lowest transaction cost incurring to the acquirer 108 for each payment transaction type. In particular, the optimization engine 226 makes a decision whether to apply a merchant specific discount or not, using the linear optimization approach. The set of metrics includes, but is not limited to, the total transaction costs for each type of payment transactions routed through each interbank network (i.e., "interbank network A") and total transaction volume being routed to each interbank network from the acquirer server 108 for the plurality of transaction types.

In one embodiment, the processor 206 is configured to store discount factors of the plurality of interbank networks in the database 204, which may updated by the interbank networks in a timely manner.

The interbank network may offer a discounted interchange rate or discounted network fee based on volume of payment transactions a merchant associated with the acquirer 108 has processed with the interbank network. A reduced interchange rate is available to the acquirer 108 when the acquirer 108 routes a number of payment transactions through the interbank network in excess of a threshold number of transactions over a fixed period of time. The fixed period of time may be, for example, a quarter or a year. In an illustrative example, interbank network "A" reduces the interchange rate it charges to merchant "A" from $0.10 per transaction to $0.075 per transaction when merchant "A" has processed more than two million transactions via the interbank network A in a year.

In another example, when the acquirer 108 routes 10000 payment transactions in one year by using an interbank network "A", the acquirer 108 may avail a 10% discount over the total transaction cost for the future payment transactions being routed through the interbank network "A".

In one implementation, discounts may also be availed on the total transaction cost incurred to the acquirer (i.e., acquirer server 108) based at least on a payment card type. For instance, if the future payment transaction is to be performed by a credit card being routed through an interbank network "A", the interbank network "A" will offer 5 percent discount to the fixed interchange cost incurring to the acquirer server 108.

In another embodiment, discounts may also be availed on the total transaction cost (i.e., "processing fee") based at least on a merchant category code (MCC) and/or business type of the merchant 120. For instance, a merchant belonging to a particular merchant category (for example, petroleum, grocery, etc.) is categorized into various tiers based on volume of payment transactions. Tier 1 may have a threshold limit of 5 million monthly transactions, tier 2 may have a threshold limit of 2 million monthly transactions, and the like. Thus, the discounts on the total transaction cost incurred to the merchant will be applicable depending upon the merchant category and the tier associated with the merchant. For example, the merchants of tier 1 may avail a discount of 10 percent, the merchants of tier 2 may avail a discount of 5 percent, and so on.

In one embodiment, the optimization engine 222 utilizes optimization techniques (e.g., "linear optimization") for optimizing the total transaction cost in light of variable discount pricing of the plurality of interbank networks.

For performing the linear optimization, the optimization engine 222 is configured to generate a transaction cost matrix C including information of the total transaction cost incurring to the acquirer 108 for the future payment transactions from each interbank network for each payment transaction type. The total transaction cost includes, but is not limited to, the fixed interchange cost and the switching cost.

Table 1 (as shown below) represents total transaction costs of a particular transaction being routed through the Network 1 and Network 2.

TABLE 1

| Transaction type | Total number of transactions | Network 1 cost per transaction | Network 2 cost per transaction |
|---|---|---|---|
| Type 1 | $T_1$ | $c_{11}$ | $c_{12}$ |
| Type 2 | $T_2$ | $c_{21}$ | $c_{22}$ |
| Type 3 | $T_3$ | $c_{31}$ | $c_{32}$ |

TABLE 2

| Transaction type | Network 1 | Network 2 |
|---|---|---|
| Type 1 | $i_{11}$ | $i_{12}$ |
| Type 2 | $i_{21}$ | $i_{22}$ |
| Type 3 | $i_{31}$ | $i_{32}$ |

As shown in Table 1, payment transaction types (e.g., Type1, Type2, and Type 3) may be at least a POS transaction, ATM transactions, E-commerce transactions and the like. Further, the Network 1, Network 2, and the Network 3 correspond to interbank networks 112a, 112b, and 112c respectively. For instance, for transaction type 1, the number of future payment transactions is $T_1$ and the total transaction cost charged by the interbank network 112a is equal to $c_{11}$.

According to the Table 2, the optimization engine 222 formulates a transaction distribution matrix for the Network 1 and Network 2 for the payment transaction types. The coefficients may have binary values of either '0' or '1'. In one embodiment, a coefficient value equal to '1' for an interchange payment network "A" of a transaction type "B" indicates that the interchange payment network "A" is the lowest processing fee and all the future transactions of the transaction type should be routed to interchange payment network "A".

The transaction cost matrix C is:

$$C = \begin{matrix} c_{11} & c_{12} \\ c_{21} & c_{22} \\ c_{31} & c_{32} \end{matrix}$$

The transaction distribution matrix I is:

$$I = \begin{matrix} i_{11} & i_{12} \\ i_{21} & i_{22} \\ i_{31} & i_{32} \end{matrix}$$

For finding values of the transaction distribution matrix, the optimization engine 222 is configured to define an objective function with one or more constraints. The optimization engine 222 is configured to maximize the objective function taking into consideration the one or more constraints. In one implementation, the objective function may be represented using the following equation (Eqn. 1). The objective function is:

$$\text{Maximize:} F = \Sigma C^* I - d^*(T_1{}^*c_{11}{}^*i_{11} + T_2{}^*c_{21}{}^*i_{12} + T_3{}^*c_{31}{}^*i_{31}) \quad \text{(Eqn. 1)}$$

In the above equation, "d" represents a discount factor (i.e., "merchant-specific discount") over the fixed interchange cost. The optimization engine 222 is configured to optimize the total transaction cost based on a dynamic decision process. In one implementation, a condition is evaluated for availing the discount for payment transactions routed through the Network 1 using the following equation (Eqn. 2).

$$\text{Discount factor: } (T_1 * i_{11} + T_2 * i_{21} + T_3 * i_{31}) > k \qquad \text{(Eqn. 2)}$$

More specifically, the optimization engine 222 is configured to apply the merchant-specific discount over the fixed interchange cost for the future payment transactions when the number of all types of the future payment transactions routing through the Network 1 is greater than a predefined threshold value (k). In one embodiment, the optimization engine 222 is also configured to satisfy the following one or more constraints while maximizing the objective function:

$$i_{11} + i_{12} = 1 \qquad \text{(Eqn. 3)}$$

$$i_{21} + i_{22} = 1 \qquad \text{(Eqn. 4)}$$

$$i_{31} + i_{32} = 1 \qquad \text{(Eqn. 5)}$$

According to Eqn. 3, 4, and 5, at a time, payment transactions of the particular payment transaction type can be routed through either the Network 1 or the Network 2.

In one embodiment, when the condition (see Eqn, 2) is not satisfied, the optimization engine 222 is configured to maximize an objective function (according to Eqn. 7) for determining an optimal interbank network for each payment transaction type without discount factor terms.

$$\text{Maximize:} F = \Sigma C * I \qquad \text{(Eqn. 7)}$$

Thus, it is understood that the optimization engine 222 applies a linear optimization algorithm to make the decision for availing the discount on the total transaction cost, or not. The decision is taken based on total transaction volume routed through the interbank network in a future period of time. In one embodiment, the optimization engine 222 may also calculate a reduced transaction cost incurring to the acquirer server 108 based on the decision. Similarly, the optimization engine 222 may apply the linear optimization algorithm for other interbank networks and find out an optimal interbank network with the lowest transaction cost.

In one embodiment, the optimization engine 222 is configured to determine the interbank network from all eligible interbank networks for routing future payment transactions based at least on customer mandates, total transaction cost incurring to the acquirer server 108, and total transaction volume for each interbank network. In other words, the optimization engine 222 may route the payment transaction through the interbank network which is identified to be charging the least total transaction cost incurring to the acquirer server 108. In other words, the optimization engine 222 determines the total transaction cost for each interbank network using the linear optimization and whichever interbank network has the lowest transaction cost, thereby reducing transaction costs for the acquirer. The server system 200 is configured to select that interbank network for transaction routing for the acquirer for the particular payment transaction type.

In one embodiment, the processor 206 is configured to store information of an optimal interbank network with a lowest transaction cost for each payment transaction type. When the processor 206 receives a payment authorization request associated with a POS transaction type from the acquirer 108 in real time, the processor 206 routes the payment authorization request to the optimal interbank network based on the linear optimization result.

It will be appreciated that in some embodiments, similar logic/algorithms alternatively may be utilized to define an optimum transaction path satisfying a plurality of conditional parameters (such as, best acceptance rate, best interchange cost, best switching cost, particular country rules, etc.). However, for the sake of brevity, the detailed explanation for finding an optimal transaction path with the best acceptance rate, best switching cost, particular transaction criteria, is omitted herein in the present disclosure.

In one embodiment, since the transaction forecasting engine 218, and the interchange prediction engine 220 include machine-learning models which use a learning-driven technique, it is possible to incrementally update the machine-learning models (e.g., from feedback provided by a human or computer administrator) so that it can adapt for routing the payment transaction that emerge over time. To do so, the machine-learning models incrementally update their probability distribution weights during a detection phase. In this regard, the machine-learning models can initially be trained using the training data and then later tuned/refined using feedback. Further, this feedback may be incorporated immediately in a dynamic online manner.

Figure 3:
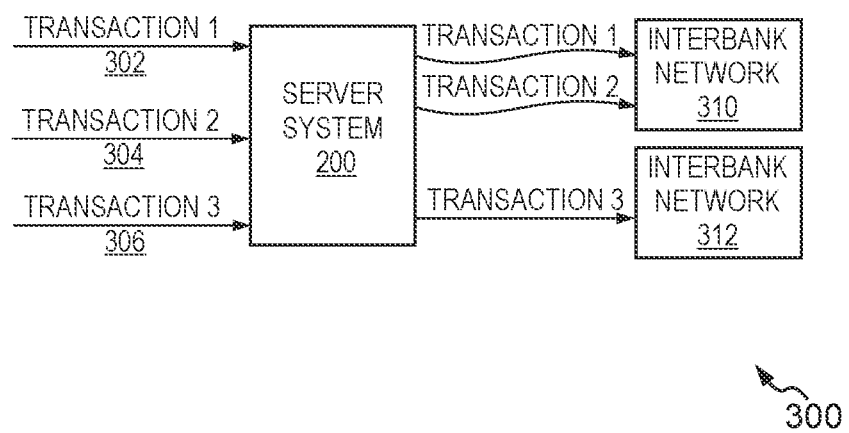
FIG. 3 is an example representation of a transaction routing process, in accordance with an example embodiment of the present disclosure.

Referring now to FIG. 3, an example representation 300 of a transaction routing process is illustrated, in accordance with an example embodiment of the present disclosure. The server system 200 receives payment transaction requests associated with payment transaction 1, transaction 2 and transaction 3 (see 302, 304 and 306) from an acquirer bank (e.g., "World bank"). The server system 200 extracts BIN information from the payment transaction requests and finds eligible interbank networks list for the transactions. Based on the eligible interbank networks lists, the server system 200 routes the transactions 1, 2 and 3 through their best interbank networks with the lowest transaction cost to the respective issuer. In this example, the transactions 1 and 2 have routed through an interbank network 310 and the transaction 3 has routed through an interbank network 312. In one example, the server system 200 has information of the best interbank networks for each transaction type, which is determined using linear optimization results.

Figure 4:
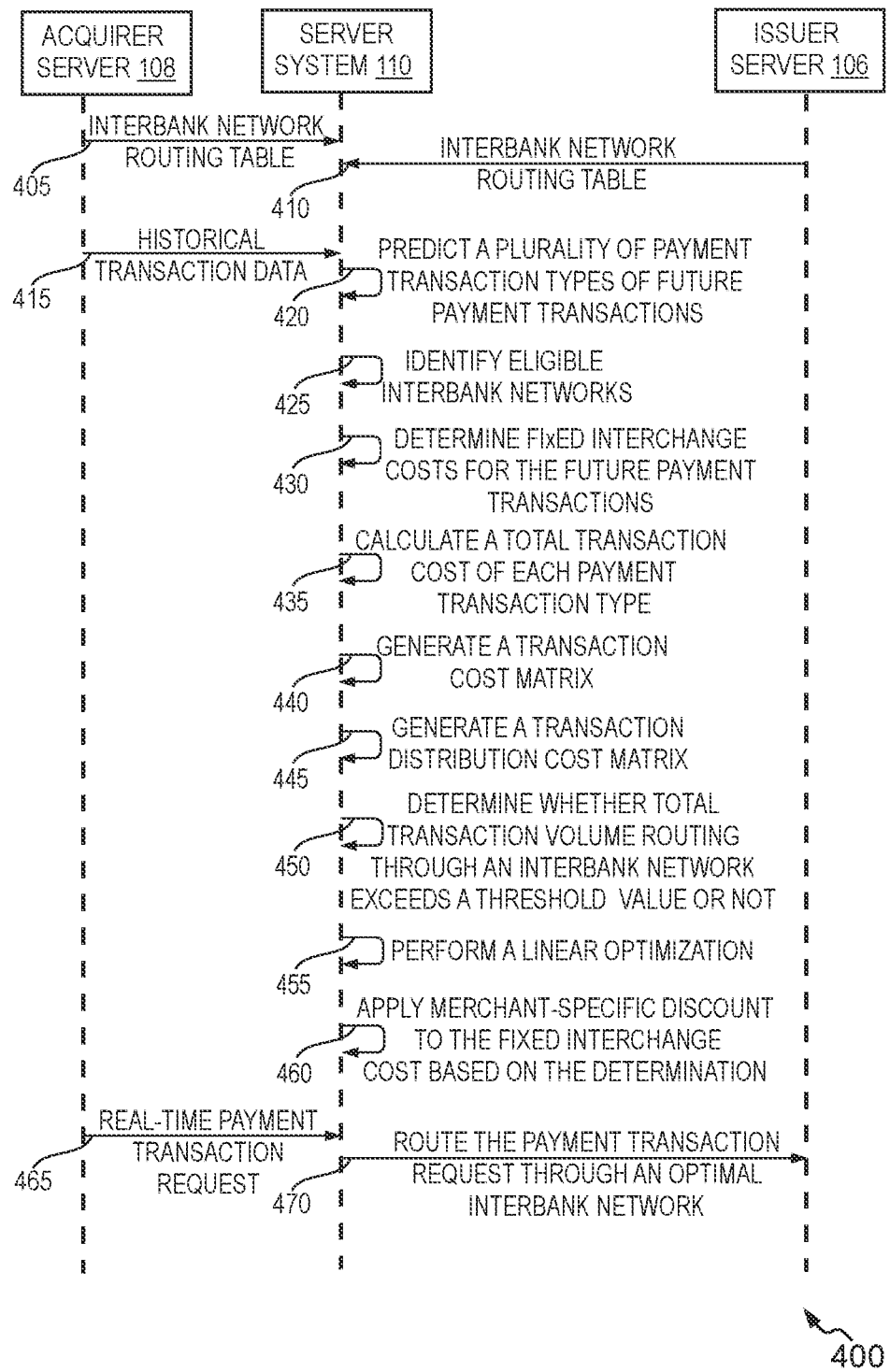
FIG. 4 is a sequence flow diagram for determining an optimal interbank network with the least transaction cost using linear optimization methods, in accordance with an embodiment of the present disclosure.

FIG. 4 represents a sequence flow diagram 400 for determining an optimal interbank network with the least transaction cost using linear optimization methods, in accordance with an example embodiment of the present disclosure. The sequence of operations of the sequence flow diagram 400 may not be necessarily executed in the same order as they are presented. Further, one or more operations may be grouped together and performed in the form of a single step, or one operation may have several sub-steps that may be performed in parallel or in a sequential manner.

At 405, the server system 110 receives an interbank network routing table from the acquirer server 108. The interbank network routing table may include, but not limited to, a list of interbank networks associated with the acquirer server 108 for routing the transactions. In one example, the list of interbank network includes interbank networks X, Y and Z. The interbank network routing table may have predefined constraints. For example, all debit card transactions will be routed through either the interbank network X or Z.

In a similar manner, at 410, the server system 110 receives an interbank routing table from the issuer server 106. In one example, a list of interbank networks associated with the issuer includes interbank networks X, Y and W.

At 415, the server system 110 receives historical transaction data associated with the acquirer server 108. The historical transaction data may include types of different payment transactions processed by the acquirer server 108 in past time.

At 420, the server system 110 predicts or determines a plurality of payment transaction types (e.g., POS, ATM, e-commerce, etc.) associated with future payment transactions from the acquirer 108 using a machine-learning model. The machine-learning model is trained based on the historical transaction data. The future payment transactions represent upcoming transactions which may happen in the future within a particular time duration (e.g., in next one year).

At 425, the server system 110 identifies eligible interbank networks for routing the payment transaction through the acquirer server 108 and the issuer server 106. The eligible interbank networks are those networks which are associated with both the acquirer 108 and the issuer 106. In one embodiment, the eligible interbank networks are also identified based on predefined static conditions between the acquirer 108 and the issuer 106. In the above example, the eligible interbank networks are interbank networks X and Y.

At 430, the server system 110 determines static, or fixed interchange costs, incurring to the acquirer 108 for different types of future payment transactions while routing through eligible interbank networks. In one example, for credit card transactions, the static interchange cost is $0.75 as defined by the issuer 106. The determination is performed using the interchange prediction model which is trained using the historical transaction data and interchange rate rules associated with the plurality of interbank networks. The interchange rate rules define what interchange cost that would be applied for each payment transaction type. In one embodiment, the fixed interchange cost is calculated based on the payment transaction type, merchant category, payment card type, and a payment transaction amount.

At 435, the server system 110 calculates a total transaction cost of each payment transaction type. The total transaction cost includes, but is not limited to, a fixed interchange cost and a switching cost. The switching cost is defined by the interbank network and for each interbank network.

At 440, the server system 110 generates a transaction cost matrix including total transaction costs incurring to the acquirer 108 from each interbank network of the eligible interbank networks. Each row of the transaction cost matrix represents the total transaction costs associated with each payment transaction type for the eligible interbank networks (e.g., interbank networks X and Y). Each column of the transaction cost matrix represents the eligible interbank networks. Thus, dimension of the transaction cost matrix depends on the number of the payment transaction types and the eligible interbank networks.

At 445, the server system 110 generates a transaction distribution matrix including binary valued coefficients associated with each payment transaction type and the eligible interbank networks. In one row of the transaction cost matrix, at a time, only one coefficient value can be '1'. It means that payment transactions related to a payment transaction type may be routed through one of the eligible interbank networks.

At 450, the server system 110 determines whether the number of future payment transactions (i.e., "total transaction volume") routing through an interbank network (e.g., "interbank network X") of a particular payment transaction type exceeds a threshold value, or not. While calculating the number of future payment transactions, the server system assumes all the payment transactions routing through the interbank network (e.g., "interbank network X").

In response to determination that the number of future payment transactions exceeds the threshold value, at 455, the server system 110 performs a linear optimization by maximizing an objective function which depends on the transaction cost matrix, the transaction distribution matrix and a discount factor associated with each interbank network. The linear optimization is performed for making a dynamic decision whether to apply a merchant-specific discount to the future payment transactions of a particular transaction type, or not. In one example, at a time, the objective function is maximized by assuming coefficient values of one interbank network are equal to '1'.

In one embodiment, when the number of payment transactions does not exceed the threshold value, the objective function does not include the discount factor terms in its mathematical formula.

In response to determination that the number of payment transactions exceeds the threshold value, at 460, the server system 110 applies the merchant-specific discount to the interchange cost for the particular payment transaction type. Therefore, a reduced transaction cost is a multiplication of the discount factor of the interbank network and the total transaction cost for each payment transaction type.

At 465, the server system 110 receives a real-time payment transaction request from the acquirer with bank identification number (BIN) of the issuer server 106.

At 470, the server system 110 automatically routes the payment transaction request to the issuer server 106 through an optimal interbank network (e.g., "interbank network X") determined by the linear optimization method.

FIGS. 5A and 5B, collectively, represent example representations depicting determination of the best interbank network for each payment transaction type in tabular form, in accordance with an example embodiment of the present disclosure. As mentioned previously, the server system 200 is configured to predict a plurality of payment transactions associated with different payment transaction types. Thereafter, the server system 200 is configured to determine fixed interchange costs of each payment transaction types routing through each eligible interbank network based on the interchange rate rules associated with the eligible interbank networks.

FIG. 5A shows a tabular representation 500 of the plurality of future payment transactions with different transaction types.

In the first row 502a of table 502, fixed interchange cost and switching cost incurring to an acquirer "CITY BANK" while routing payment transactions through an interbank network 112a are shown for a particular transaction type (i.e., card type: debit card, merchant: "XYZ", payment transaction terminal: POS device, and authentication method: PIN). The server system 200 determines volume of future transactions (e.g., "1000") routing through the interbank network 112a for the particular transaction type based on the previous transaction history of the merchant "XYZ". Further, the server system 200 also determines fixed interchange cost (e.g., $01) for the particular transaction type. The switching cost, which is static cost for every transaction routing through the interbank network 112a, is $0.1. In a similar manner, the server system also determines fixed interchange costs and volume of transactions routing through the interbank networks 112b and 112c for the particular transaction type (see 504a in table 504, and 506a in table 506).

In the second row 502b of table 502, a fixed interchange cost and a switching cost incurring to the acquirer "CITY BANK" while routing the payment transactions through the interbank network 112a are shown for a particular transaction type (i.e., card type: debit card, payment transaction terminal: ATM device, and authentication method: PINless). The server system 200 determines volume of future transactions (e.g., "800") routing through the interbank network 112a for the particular transaction type based on the previous cash withdrawal history of the ATM terminal. Then, the server system 200 determines fixed interchange cost (e.g., $1.5) for the particular transaction type. In a similar manner, the server system also determines fixed interchange costs and volume of transactions routing through the interbank networks 112b and 112c for the particular transaction type (see 504b in table 504, and 506b in table 506).

Based on the fixed interchange cost and the switching cost for each interbank network, the server system 200 calculates a total transaction cost for each payment transaction type and generates a transaction cost matrix.

As shown in FIG. 5B, the server system 200 applies a linear optimization 508 using a set of metrics, such as the transaction cost matrix, a discount factor of each interbank network, and a predetermined threshold value for the volume of transaction. Based on the set of metrics, the server system 200 decides whether to apply a merchant specific discount over the fixed interchange cost, or not.

In a table 510, the best interbank network for each type of payment transactions is shown. Based on the best interbank network information, the server system 200 routes the future payment transactions through an optimal interbank network with the lowest transaction cost.

FIG. 6 illustrates a flow diagram of a method 600 for determining an optimal interbank network with the lowest total transaction cost for future payment transactions between the acquirer 108 and the issuer 106, in accordance with an example embodiment. The method 600 depicted in the flow diagram may be executed by, for example, the at least one server, such as the server system 110 explained with reference to FIG. 2, the issuer server 106, the acquirer server 108, and the payment gateway server 114. Operations of the flow diagram of method 600, and combinations of operation in the flow diagram of method 600, may be implemented by, for example, hardware, firmware, a processor, circuitry, and/or a different device associated with the execution of software that includes one or more computer program instructions. It is noted that the operations of the method 600 can be described and/or practiced by using a system other than these server systems. The method 600 starts at operation 602.

At 602, the method 600 includes accessing historical transaction data associated with the acquirer 108 from an acquirer database. The historical transaction data represents transaction history between the acquirer 108 and an issuer 106 in past time.

At 604, the method 600 includes determining, by the server system, a plurality of payment transaction types corresponding to future payment transactions processing via the acquirer 108 for a particular period of time based, at least in part, on the historical transaction data. In one embodiment, the method 600 further includes predicting the plurality of payment transaction types of the future payment transactions using a machine-learning model, where the machine-learning model is trained based, at least in part, on the historical transaction data between the acquirer 108 and an issuer 106.

At 606, the method 600 includes predicting a fixed interchange cost for each payment transaction type incurring to the acquirer 108 for routing the future payment transactions through an interbank network of a plurality of interbank networks based, at least in part, on an interchange prediction model. The interchange prediction model is trained based at least on interchange rate rules of the plurality of interbank networks. In addition, the fixed interchange cost is calculated based at least in part on the payment transaction type, merchant category code (MCC), payment card type, and a payment transaction amount.

At 608, the method 600 includes performing a linear optimization utilizing a set of metrics, to make a decision whether to apply a merchant-specific discount to a particular payment transaction type, or not. The set of metrics includes a total transaction cost for each payment transaction type, a discount factor (e.g., 0.02) associated with the interbank network, and a number of payment transactions routing through the interbank network.

At 610, the method 600 includes routing real-time payment transactions through an optimal interbank network with the lowest total transaction cost, wherein the optimal interbank network is determined using the linear optimization.

FIG. 7 is a simplified block diagram of an acquirer server 700, in accordance with an embodiment of the present disclosure. The acquirer server 700 is associated with the acquiring bank of a merchant (e.g., the merchant 120) where the merchant has established an account to accept the upcoming payment transactions though a suitable inter-bank network. The acquirer server 700 is an example of the acquirer server 108 of FIG. 1, or may be embodied in the acquirer server 108. The acquirer server 700 includes a processing module 705 configured to extract programming instructions from a memory 710 to provide various features of the present disclosure. Further, the acquirer server 700 includes a processing module 705 communicably coupled to a database 715 and a communication module 720. In a non-limiting example, the database 715 is an example of the database 204 of FIG. 2. The components of the acquirer server 700 provided herein may not be exhaustive, and the acquirer server 700 may include more or fewer components than that depicted in FIG. 7. Further, two or more components may be embodied in one single component, and/or one component may be configured using multiple sub-components to achieve the desired functionalities. Some components of the acquirer server 700 may be configured using hardware elements, software elements, firmware elements, and/or a combination thereof.

Via the communication module 720, the processing module 705 receives information from a remote device 725, such as the issuer server 106, the server system 200, the interbank networks 112a-112c, and the payment transaction terminal 118. In particular, the processing module 705 receives the information related to payment transactions between the acquiring bank and the issuing bank. Upon receiving the payment transaction details, the processing module 705 stores and/or records the payment transactions in the database 715. For instance, the payment transactions performed by the cardholder 102 using the payment card 104 at the payment transaction terminal 118 of the merchant 120 may be stored in the database 715. It is understood that the payment transaction details stored in the database 715 correspond to the historical transaction data.

In an embodiment, the server system 200 may access the database 715 via the communication module 720, which includes historical transaction data associated with the acquirer server 700 for training one or more machine-learning models of the server system 200. In one embodiment, the database 715 also stores an interbank network routing table including information of interbank networks associated with the acquirer server 700. In an embodiment, the communication module 720 is capable of facilitating operative communication with the remote device 725 using API calls. The communication may be achieved over a communication network, such as the network 116.

FIG. 8 is a simplified block diagram of a payment gateway server 800, in accordance with an embodiment of the present disclosure. The payment gateway server 800 is an example of the payment gateway server 114 of FIG. 1. For instance, the interchange payment network 112*a* may be used by the payment gateway server 800, the issuer server 106 and the acquirer server 700 as a payment interbank network. Examples of payment interbank networks include, but not limited to, Mastercard® payment system interchange network. The payment gateway server 800 includes a processing system 805 configured to extract programming instructions from a memory 810 to provide various features of the present disclosure. The components of the payment gateway server 800 provided herein may not be exhaustive and the payment gateway server 800 may include more or fewer components than those depicted in FIG. 8. Further, two or more components may be embodied in one single component, and/or one component may be configured using multiple sub-components to achieve the desired functionalities. Some components of the payment gateway server 800 may be configured using hardware elements, software elements, firmware elements and/or a combination thereof.

Via a communication interface 815, the processing system 805 receives information from a remote device 825, such as the issuer server 106, the acquirer server 700, and the server system 200. In an embodiment, the payment gateway server 800, including a database 820, may store an optimal interbank network with the lowest transaction cost for each payment transaction type. The payment gateway server 800 may also perform similar operations as performed by the server system 110 or the server system 200 for determining the optimal interbank network for each payment transaction type for future payment transaction taking into consideration various dynamic factors affecting the lowest transaction cost. For the sake of brevity, the detailed explanation of the payment gateway server 800 is omitted herein with reference to FIGS. 1 and 2.

FIG. 9 is a simplified block diagram of an issuer server 900, in accordance with one embodiment of the present disclosure. The issuer server 900 is associated with an issuer bank/issuer, in which a user (e.g., the user 102) may have an account. The issuer server 900 is an example of the issuer server 106 of FIG. 1, or may be embodied in the issuer server 106. The issuer server 900 includes a processor 905 communicably coupled to a database 910 and a communication module 915. The components of the issuer server 900 provided herein may not be exhaustive, and the issuer server 900 may include more or fewer components than those depicted in FIG. 9. Further, two or more components may be embodied in one single component, and/or one component may be configured using multiple sub-components to achieve the desired functionalities. Some components of the issuer server 900 may be configured using hardware elements, software elements, firmware elements, and/or a combination thereof.

The database 910 includes information associated with the user 102, such as, but not limited to, a primary account number (PAN one or more parameters), a name, a city, a postal code, and the like.

Via a communication module 915, the processor 905 may receive information from a remote device 920, such as the issuer server 106, server system 200, the acquirer server 700, and the payment gateway server 800. In an embodiment, the processor 905 may communicate the information related to the user 102 to the server system 200 for predicting the suitable interbank network for the particular payment transaction type associated with each upcoming payment transaction.

FIG. 10 is a simplified block diagram of a user device 1000, for example, a mobile phone or a desktop computer capable of implementing the various embodiments of the present disclosure. For example, the user device 1000 may correspond to the user device 118*c* of FIG. 1. The user device 1000 is depicted to include one or more applications, such as a payment gateway application 1006. The payment gateway application 1006 can be an instance of an application downloaded from a third-party server or a payment gateway server. The payment gateway application 1006 is capable of communicating with the acquirer server 108, or the payment gateway server, for facilitating payment transaction processing.

It should be understood that the user device 1000 as illustrated and hereinafter described is merely illustrative of one type of device and should not be taken to limit the scope of the embodiments. As such, it should be appreciated that at least some of the components described below in connection with that the user device 1000 may be optional and thus in an example embodiment may include more, less or different components than those described in connection with the example embodiment of the FIG. 10. As such, among other examples, the user device 1000 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1000 includes a controller or a processor 1002 (e.g., a signal processor, microprocessor, ASIC, or other control and processing logic circuitry) for performing such tasks as signal coding, data processing, image processing, input/output processing, power control, and/or other functions. An operating system 1004 controls the allocation and usage of the components of the user device 1000 and support for one or more payment transaction applications programs (see, the applications 1006) such as the payment gateway application, that implements one or more of the innovative features described herein. In addition, to the payment gateway application, the applications 1006 may include common mobile computing applications (e.g., telephony applications, email applications, calendars, contact managers, web browsers, messaging applications) or any other computing application.

The illustrated user device 1000 includes one or more memory components, for example, a non-removable memory 1008 and/or removable memory 1010. The non-removable memory 1008 and/or the removable memory 1010 may be collectively known as a database in an embodiment. The non-removable memory 1008 can include RAM, ROM, flash memory, a hard disk, or other well-known memory storage technologies. The removable memory 1010 can include flash memory, smart cards, or a Subscriber Identity Module (SIM). The one or more memory components can be used for storing data and/or code for running the operating system 1004 and the applications 1006. The user device 1000 may further include a user identity module (UIM) 1012. The UIM 1012 may be a memory device having a processor built in. The UIM 1012 may include, for example, a subscriber identity module (SIM), a universal integrated circuit card (UICC), a universal subscriber identity module (USIM), a removable user identity module (R-UIM), or any other smart card. The UIM 1012 typically stores information elements related to a mobile subscriber.

The UIM 1012 in the form of the SIM card is well known in Global System for Mobile Communications (GSM), communication systems, Code Division Multiple Access (CDMA) systems, or with third-generation (3G) wireless communication protocols, such as Universal Mobile Telecommunications System (UMTS), CDMA9000, wideband CDMA (WCDMA) and time division-synchronous CDMA (TD-SCDMA), or with fourth-generation (4G) wireless communication protocols, such as LTE (Long-Term Evolution).

The user device 1000 can support one or more input devices 1020 and one or more output devices 1030. Examples of the input devices 1020 may include, but are not limited to, a touch screen/a display screen 1022 (e.g., capable of capturing finger tap inputs, finger gesture inputs, multi-finger tap inputs, multi-finger gesture inputs, or keystroke inputs from a virtual keyboard or keypad), a microphone 1024 (e.g., capable of capturing voice input), a camera module 1026 (e.g., capable of capturing still picture images and/or video images) and a physical keyboard 1028. Examples of the output devices 1030 may include, but are not limited to a speaker 1032 and a display 1034. Other possible output devices can include piezoelectric or other haptic output devices. Some devices can serve more than one input/output function. For example, the touch screen 1022 and the display 1034 can be combined into a single input/output device.

A wireless modem 1040 can be coupled to one or more antennas (not shown in FIG. 10) and can support two-way communications between the processor 1002 and external devices, as is well understood in the art. The wireless modem 1040 is shown generically and can include, for example, a cellular modem 1042 for communicating at long range with the mobile communication network, a Wi-Fi compatible modem 1044 for communicating at short range with an external Bluetooth-equipped device or a local wireless data network or router, and/or a Bluetooth-compatible modem 1046. The wireless modem 1040 is typically configured for communication with one or more cellular networks, such as a GSM network for data and voice communications within a single cellular network, between cellular networks, or between the user device 1000 and a public switched telephone network (PSTN).

The user device 1000 can further include one or more input/output ports 1050, a power supply 1052, one or more sensors 1054, for example, an accelerometer, a gyroscope, a compass, or an infrared proximity sensor for detecting the orientation or motion of the user device 1000 and biometric sensors for scanning biometric identity of an authorized user, a transceiver 1056 (for wirelessly transmitting analog or digital signals) and/or a physical connector 1060, which can be a USB port, IEEE 1294 (FireWire) port, and/or RS-232 port. The illustrated components are not required or all-inclusive, as any of the components shown can be deleted and other components can be added.

The disclosed method with reference to FIG. 6, or one or more operations of the server system 200 may be implemented using software, including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 200, and its various components, may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more nonvolatile memory devices, and/or a combination of one or more volatile memory devices and nonvolatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, and as described, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
accessing, by a server system, historical transaction data associated with an acquirer from an acquirer database;
determining, by the server system, via a machine-learning model, a plurality of payment transaction types corresponding to future payment transactions processing by the acquirer for a particular period of time based on the historical transaction data, the machine-learning model trained on the historical transaction data;
predicting, by the server system, via an interchange prediction model, a fixed interchange cost for each of the payment transaction types incurring to the acquirer for routing the future payment transactions through an interbank network of a plurality of interbank networks;
performing, by the server system, a linear optimization based on a set of metrics, to make a decision whether to apply a merchant-specific discount to a particular payment transaction type or not, the set of metrics comprising a total transaction cost for each payment transaction type, a discount factor associated with the interbank network of the plurality of interbank networks, and a number of future payment transactions routing through the interbank network;
based on the linear optimization:
applying, by the server system, the merchant-specific discount to at least one fixed interchange cost for the particular payment transaction type, based on at least one of: the number of future payment transactions routing through the interbank network exceeding a predetermined threshold value, the total transaction cost for a payment card type exceeding a predetermined total threshold value, or the total transaction cost for a merchant category exceeding a predetermined merchant category threshold value;
selecting, by the server system, a particular interbank network of the plurality of interbank networks with a lowest total transaction cost based on the applied merchant-specific discount; and routing, by the server system, real-time payment transactions through the selected particular interbank network.

2. The computer-implemented method of claim 1, wherein the server system is a payment gateway server.

3. The computer-implemented method of claim 2, wherein the interchange prediction model is trained based at least on interchange rate rules of the plurality of interbank networks, and wherein the at least one fixed interchange cost is based on the particular payment transaction type, the merchant category, the payment card type, and a payment transaction amount.

4. The computer-implemented method of claim 2, wherein the total transaction cost is a sum of at least the fixed interchange cost and a switching cost.

5. The computer-implemented method of claim 2, wherein performing the linear optimization further comprises:

generating, by the server system, a transaction cost matrix comprising total transaction costs incurring to the acquirer from each interbank network of the plurality of interbank networks for each of the payment transaction types.

6. The computer-implemented method of claim 2, wherein the plurality of payment transaction types include Point-of-Sale (POS) transactions; Automatic Teller Machine (ATM) transactions; and/or e-commerce based payment transactions.

7. The computer-implemented method of claim 1, further comprising:

identifying, by the server system, the plurality of interbank networks which are eligible for routing the future payment transactions between the acquirer and the issuer based, at least in part, on interbank network routing tables associated with the acquirer and the issuer, and predefined constraints between the acquirer and the issuer.

8. A server system, comprising:

a communication interface;

a memory comprising executable instructions; and a processor communicably coupled to the communication interface, the processor configured to execute the executable instructions to cause the server system to at least:

access historical transaction data associated with an acquirer from an acquirer database, determine, via a machine-learning model, a plurality of payment transaction types corresponding to future payment transactions processing by the acquirer for a particular period of time based on the historical transaction data, the machine-learning model trained on the historical transaction data, predict, via an interchange prediction model, a fixed interchange cost for each of the payment transaction types incurring to the acquirer for routing the future payment transactions through an interbank network of a plurality of interbank networks, perform a linear optimization based on utilizing a set of metrics, to make a decision whether to apply a merchant-specific discount to a particular payment transaction type, or not, the set of metrics comprising a total transaction cost for each payment transaction type, a discount factor associated with the interbank network of the plurality of interbank networks, and a number of future payment transactions routing through the interbank network, based on the linear optimization:

apply, by the server system, the merchant-specific discount to at least one fixed interchange cost for the particular payment transaction type based on at least one of the number of future payment transactions routing through the interbank network exceeding a predetermined threshold value, the total transaction cost for a payment card type exceeding a predetermined total threshold value, or the total transaction cost for a merchant category exceeding a predetermined merchant category threshold value;

select, by the server system, a particular interbank network of the plurality of interbank networks with a lowest total transaction cost based on the applied merchant-specific discount; and route real-time payment transactions through the selected particular interbank network.

9. The server system of claim 8, wherein the server system is a payment gateway server.

10. The server system of claim 9, wherein the interchange prediction model is trained based at least on interchange rate rules of the plurality of interbank networks, and wherein the at least one fixed interchange cost is based on the particular payment transaction type, the merchant category, the payment card type, and a payment transaction amount.

11. The server system of claim 9, wherein the server system is further caused at least in part to:

identify the plurality of interbank networks which are eligible for routing the future payment transactions between the acquirer and the issuer based, at least in part, on interbank network routing tables associated with the acquirer and the issuer, and predefined constraints between the acquirer and the issuer.

12. The server system of claim 9, wherein the total transaction cost is a sum of at least the fixed interchange cost and a switching cost.

13. The server system of claim 9, wherein the server system is further caused at least in part to:

generate a transaction cost matrix comprising total transaction costs incurring to the acquirer from each interbank network of the plurality of interbank networks for each of the payment transaction types.

14. The server system of claim 9, wherein the plurality of payment transaction types include is at least Point-of-Sale (POS), Automatic Teller Machine (ATM), and/or e-commerce based payment transactions.

* * * * *